Oct. 12, 1954
K. DAUGIRDAS
2,691,195
MOLD MAKING APPARATUS
Filed July 22, 1952
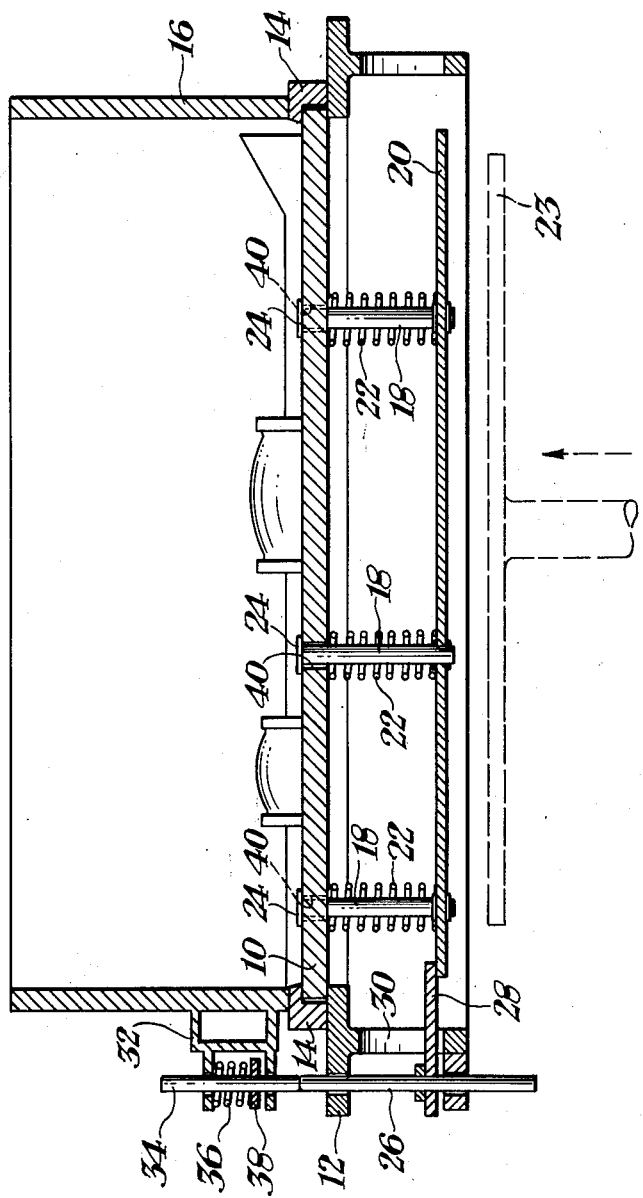
INVENTOR.
Kristupas Daugirdas.
BY
HIS ATTORNEY Patented Oct. 12, 1954

2,691,195

UNITED STATES PATENT OFFICE 2,691,195

MOLD MAKING APPARATUS

Kristupas Daugirdas, South Boston, Mass., assignor to Walworth Company, Boston, Mass., a corporation of Massachusetts Application July 22, 1952, Serial No. 300,194

7 Claims. (Cl. 22—48)

This invention relates to mold making apparatus and more particularly to apparatus for making shell-type molds.

Shell-type molds are usually formed on a metallic pattern plate by a process which includes the steps of depositing mold forming material on a heated pattern plate, inverting the pattern plate to remove excess mold forming material therefrom, baking the mold forming material on the pattern plate, and ejecting the finished mold. In the past, ejection has been effected by means of ejector pins extending through the pattern plate and axially movable to dislodge the finished mold therefrom. Such ejector pins are usually biased to an inactive position by means of springs carried by the pattern plate. However, since the pattern plate and springs are subjected to elevated temperatures, these springs become weakened very quickly and must be replaced at relatively short intervals to be effective for retaining the ejector pins in their inactive position while the pattern plate is being inverted.

It is a principal object of this invention to retain the ejector means in apparatus of this type in its inactive position when the pattern plate is inverted.

Another object of this invention is to retain the ejector means inactive while mold forming material is being applied to the pattern plate.

Another object of this invention is to maintain the ejector means ineffective whenever a flask is operatively associated with the pattern plate for retaining mold forming material thereon.

In a preferred embodiment of this invention, detent means carried by a flask operatively engage the ejector means to prevent the same from moving to dislodge a mold from the pattern plate whenever the flask is in engagement with the pattern plate.

Other objects and advantages will become apparent from the following specification taken in connection with the accompanying drawing which is a sectional view of an assembly of a pattern plate, flask, and mold ejection device embodying this invention.

Referring more particularly to the drawing, a pattern plate 10 is shown as mounted on a suitable frame 12 and securely clamped thereto by means of clamping elements 14. A flask comprising a rectangular frame 16 is superimposed on the pattern plate 10 and is cooperable therewith for retaining mold forming material thereon and is here shown as having one edge in contact with the clamping elements 14. The assembly of the frame 12, pattern plate 10 and flask 16 may be rotatable by any suitable mechanism (not shown) for dumping excess mold forming material, leaving only sufficient mold forming material adjacent the pattern plate 10 to form the desired mold shell.

Ejection means for dislodging a finished mold from the pattern plate 10 is provided and may take the form of a plurality of ejector pins 18 each of which has one end secured to a movable support plate 20 disposed beneath the pattern plate 10. The other ends of the pins 18 are slidably received in bores 40 formed in and extending through the pattern plate 10. The plate 20 and its associated pins 18 are biased away from the pattern plate 10 by a plurality of springs 22 disposed between these members, movement of the plate 20 under such bias being limited by abutment means or heads 24 formed on the ends of selected pins 18 to engage the surface of the pattern plate 10. The plate 20 and pins 18 may be moved against the bias of the springs 22 to dislodge a mold from the pattern plate 10 by a suitable piston 23 disposed beneath the frame 12.

It will be apparent that since the springs 22 are carried by the pattern plate 10, they will be subjected to the same baking temperatures as the pattern plate. Accordingly, their life will be relatively short and they cannot be relied upon to prevent movement of the pins 18 through the bores 40 under the force of gravity when the pattern plate assembly is inverted.

To prevent operation of the ejector pins 18 upon inversion of the pattern plate 10, latching or detent means forming an abutment means is provided for holding the plate 20 and pins 18 in their biased position whenever the flask 16 is in operative engagement with the pattern plate 10. The detent means is here shown as comprising a pin 26 slidably mounted in the frame 12 outboard of the pattern plate 10 and parallel to the pins 18. A cantilever 28 carried by the pin 26 extends through a suitable aperture 30 in the frame 12 and the free end thereof is engageable with the top of the plate 20. The aperture 30 is preferably large enough to permit the cantilever 28 and pin 26 to be rotated to move the free end of the cantilever 28 out of engagement with the plate 20 so that the assembly of the pattern plate 10, ejector pins 18, and plate 20 may be removed from the frame.

Extending laterally from the side of the flask 16 is a second abutment means in the form of a bracket 32 in which is slidably mounted a second pin 34. The pin 34 is arranged to be axially aligned with and to contact the end of the pin 26 when the flask 16 is mounted upon the pattern plate 10. A spring 36 acting between the bracket 32 and a collar 38 carried by the pin 34 serves to bias the pin 34 toward the pin 26. The bias of the spring 36 is transmitted through the pins 34, 26 and the cantilever 28 to the plate 20 to maintain the same in its inactive position with the heads 24 of the pins 18 in engagement with the top of pattern plate 10.

Thus, upon inversion of the frame 12, the pattern plate 10 and the flask 16, the plate 20 and its associated pins 18 will be maintained in their inactive position regardless of the condition of the springs 22. It will be understood that a plurality of the above described detent means may be positioned at spaced points on the flask 16 if desired.

It is to be noted that the provision of the spring 36 provides an override connection between the pin 34 and the flask 16 to insure positive transmission of force from the flask 16 to the plate 20 and accurate vertical location of the bracket 32 on the flask 16 is therefore unnecessary.

It is to be understood that the invention is not limited to the particular embodiment thereof herein illustrated and described except insofar as is defined by the appended claims.

It is claimed and desired to secure by Letters Patent:

1. In a device for making shell-type molds, the combination comprising a pattern plate, a flask cooperable with said pattern plate for retaining mold forming material deposited thereon, ejection means movable relative to said pattern plate for ejecting a finished mold therefrom, abutment means operatively engageable with said ejection means, and second abutment means operatively associated with the first said flask and engageable with the first said abutment means for preventing said relative movement while said flask is operatively associated with said pattern plate.

2. In a device for making shell-type molds, the combination comprising a pattern plate, a flask cooperable with said pattern plate for retaining mold forming material deposited thereon, ejection means including a supporting member and a plurality of ejector pins extending therefrom through said pattern plate for engagement with a shell mold formed thereon, and detent means cooperable with said supporting member and said flask for preventing movement of said pins while said flask is operatively associated with said pattern plate.

3. In an apparatus for making shell-type molds, the combination comprising a pattern plate, ejection means including a plurality of ejector pins extending through said pattern plate for engagement with a shell-type mold formed thereon, said ejector pins being biased to one position, a movable member supporting said pins, abutment means on said movable member, a flask engageable with said pattern plate, and yieldable abutment means on said flask and operatively engageable with the first said abutment means for holding said pins in said biased position while said flask is in engagement with said pattern plate.

4. In an apparatus for making shell-type molds, the combination comprising a pattern plate, ejection means including a plurality of movable ejector pins extending through said pattern plate for engagement with a shell mold formed thereon, a movable member supporting said pins, abutment means operatively engageable with said supporting member and extending laterally beyond the edge of said pattern plate, a flask operatively engageable with said pattern plate, and second abutment means operatively associated with said flask for engagement with the first said abutment means while said flask is in operative engagement with said pattern plate for holding said pins in a predetermined position.

5. Apparatus as claimed in claim 4 wherein said second abutment means is operatively connected to said flask through an override connection.

6. Apparatus as claimed in claim 4 wherein said first named abutment means includes a rotatable member operable for moving said first abutment means out of operative engagement with said supporting member.

7. In an apparatus for making shell-type molds, the combination of a pattern plate having apertures therein, a movable plate located on the underside of said pattern plate, a plurality of ejector pins carried on said movable plate and extending into said apertures, spring means carried by said pins and normally operative between said plates for spacing one from the other and maintaining said pins in a retracted position relative to said pattern plate, abutment means having a portion engageable with said movable plate and extending laterally beyond the edge of said pattern plate, a flask operatively engageable with said pattern plate, and second abutment means extending laterally from said flask and having a portion operatively engageable with said first abutment means for retaining said movable plate in spaced relation with said pattern plate and said pins in said retracted position irrespective of whether said spring means remain operative.

References Cited in the file of this patent

UNITED STATES PATENTS

| Number | Name | Date |
|---|---|---|
| 976,833 | Ronceray | Nov. 22, 1910 |
| 1,561,281 | Rau et al. | Nov. 10, 1925 |
| 1,782,762 | Morris et al. | Nov. 25, 1930 |

OTHER REFERENCES

Bakelite Phenolic Resins, 15 pages, page 15 relied on; copyright 1950 by Union Carbide and Carbon Co.